United States Patent
Chuang

(10) Patent No.: US 9,100,808 B2
(45) Date of Patent: Aug. 4, 2015

(54) METHOD OF HANDLING SMS MESSAGES AND RELATED COMMUNICATION SYSTEM

(71) Applicant: ACER INCORPORATED, New Taipei (TW)

(72) Inventor: Chia-Yun Chuang, New Taipei (TW)

(73) Assignee: ACER INCORPORATED, Xizhi Dist., New Taipei (TW)

( * ) Notice: Subject to any disclaimer, the term of this patent is extended or adjusted under 35 U.S.C. 154(b) by 0 days.

(21) Appl. No.: 14/052,768

(22) Filed: Oct. 13, 2013

(65) Prior Publication Data

US 2015/0105054 A1    Apr. 16, 2015

(51) Int. Cl.
*H04M 1/725* (2006.01)
*H04W 4/14* (2009.01)

(52) U.S. Cl.
CPC ...................... *H04W 4/14* (2013.01)

(58) Field of Classification Search
CPC .. H04L 12/5835; H04L 12/5895; H04W 4/14

USPC ............................ 455/412.1, 412.2, 466, 566
See application file for complete search history.

(56) References Cited

U.S. PATENT DOCUMENTS

| | | | |
|---|---|---|---|
| 2003/0040300 A1* | 2/2003 | Bodic et al. .................... | 455/412 |
| 2008/0096590 A1* | 4/2008 | Celik et al. ..................... | 455/466 |
| 2011/0039584 A1* | 2/2011 | Merrett .......................... | 455/466 |
| 2011/0217997 A1* | 9/2011 | Jimenez Aldama et al. .. | 455/466 |
| 2013/0035121 A1* | 2/2013 | Russell .......................... | 455/466 |
| 2014/0179359 A1* | 6/2014 | Wijbrans et al. .............. | 455/466 |
| 2014/0206403 A1* | 7/2014 | Buckley et al. ............... | 455/466 |

* cited by examiner

*Primary Examiner* — Charles Shedrick
(74) *Attorney, Agent, or Firm* — Winston Hsu; Scott Margo

(57) ABSTRACT

In a communication system, an SMS message can be transmitted from a sending entity to a receiving entity. The sending entity is configured to encode the SMS message by inserting both the sender number and the sender text description of the sending entity in the TP-OA field of the SMS message. After transmission, the receiving entity is configured decode the TP-OA field of the encoded SMS message and simultaneously display the sender number and the sender description as the title of the SMS message on a screen.

6 Claims, 4 Drawing Sheets

| Type_of_number |||||
|---|---|---|---|---|
| Bits | 6 | 5 | 4 | |
| | 0 | 0 | 0 | Unknown[1] |
| | 0 | 0 | 1 | International number[2] |
| | 0 | 1 | 0 | National number[3] |
| | 0 | 1 | 1 | Network specific number[4] |
| | 1 | 0 | 0 | Subscriber number[5] |
| | 1 | 0 | 1 | Alphanumeric, (coded according to 3GPP TS 23.038 [9] GSM 7-bit default alphabet) |
| | 1 | 1 | 0 | Abbreviated number |
| | 1 | 1 | 1 | Reserved for extension |

(1) "Unknown" is used when the user or network has no a priori information about the numbering plan. In this case, the Address-Value field is organized according to the network dialling plan, e.g. prefix or escape digits might be present.

(2) The international format shall be accepted also when the message is destined to a recipient in the same country as the MSC or as the SGSN.

(3) Prefix or escape digits shall not be included.

(4) "Network specific number" is used to indicate administration/service number specific to the serving network, e.g. used to access an operator.

(5) "Subscriber number" is used when a specific short number representation is stored in one or more SCs as part of a higher layer application. (Note that "Subscriber number" shall only be used in connection with the proper PID referring to this application).

FIG. 3

| Numbering_plan_identification |||||
|---|---|---|---|---|
| Bits | 3 | 2 | 1 | 0 |
| | 0 | 0 | 0 | 0 | Unknown |
| | 0 | 0 | 0 | 1 | ISDN/telephone numbering plan (E.164 [17]/E.163[18]) |
| | 0 | 0 | 1 | 1 | Data numbering plan (X.121) |
| | 0 | 1 | 0 | 0 | Telex numbering plan |
| | 0 | 1 | 0 | 1 | Service Centre Specific plan[1] |
| | 0 | 1 | 1 | 0 | Service Centre Specific plan[1] |
| | 1 | 0 | 0 | 0 | National numbering plan |
| | 1 | 0 | 0 | 1 | Private numbering plan |
| | 1 | 0 | 1 | 0 | ERMES numbering plan (ETSI DE/PS 3 01-3) |
| | 1 | 1 | 1 | 1 | Reserved for extension |
| | All other values are reserved |||||
| (1)"Service Centre specific number" is used to indicate a numbering plan specific to External Short Message Entities attached to the SMSC |||||

FIG. 4

METHOD OF HANDLING SMS MESSAGES AND RELATED COMMUNICATION SYSTEM

BACKGROUND OF THE INVENTION

1. Field of the Invention

The present invention is related to a method of handling SMS messages and related system, and more particularly, to a method of handling SMS messages capable of providing efficient recognition of a sending entity and related system.

2. Description of the Prior Art

The short message service (SMS) is a messaging mechanism that enables short messages of generally no more than 140~160 characters in length to be transmitted from, and received by a wireless communications device.

First introduced in the Global System for Mobile Communications (GSM) system, SMS is currently supported by a majority of other digital-based mobile communications systems, such as Universal Mobile Telecommunications System (UMTS) and Long Term Evolution (LTE) system. The message payload commonly contains plain text, but there are provisions for other types of data, such as pictures, graphics, ring tones, etc. Unlike paging, messages are stored in and forwarded to SMS centers in an SMS system. SMS messages travel to wireless communications devices over the wireless communication coverage network control channel, which is separate and apart from the voice channel.

According to SMS-related 3rd Generation Partnership Project (3GPP) technical specifications, the source address from which an SMS message originated is encoded in a field known as Transfer-Protocol-Originating-Address (TP-OA) field of the an SMS message. When receiving multiple SMS messages, the receiving entity decodes each SMS message and generally only displays the title of each SMS message according to the decoded content the TP-OA fields. The user may then view a specific SMS message by selecting a specific title.

In the prior art SMS encoding scheme, the TP-OA field only contains information related to the number of the sending entity. When the sending entity has a non-routable number which cannot be replied to, or the number of the sending entity is not included in the contact list stored in the receiving entity, the user may not to able to recognize the exact identity of the sending entity from the title of the SMS message. The user may need to spend time reading the content of the SMS message whose title is an unfamiliar number before realizing it is actually an unimportant SMS message. Therefore, there is a need for a method of handling SMS messages in order to provide efficient recognition of the sending entity.

SUMMARY OF THE INVENTION

The present invention provides method of handling an SMS message which is sent from a sending entity to a receiving entity. The method includes providing a number and a text description associated with the sending entity; the sending entity encoding the SMS message by inserting the number and the text description in a TP-OA field of the SMS message; the sending entity transmitting the encoded SMS message to the receiving entity; the receiving entity decoding the TP-OA field of the received encoded SMS message for acquiring the number and the text description associated with the sending entity; and the receiving entity simultaneously displaying the number and the text description associated with the sending entity as a title of the SMS message on a screen.

The present invention further provides a communication system having a sending entity and a receiving entity for performing SMS operations. The sending entity includes a processing component configured to encode an SMS message by inserting a number and a text description associated with the sending entity in a TP-OA field of the SMS message; and a network connectivity unit configured to transmit the encoded SMS message. The receiving entity includes a network connectivity unit configured to receive the encoded SMS message sent from the sending entity; a processing component configured to decode the TP-OA field of the received encoded SMS message for acquiring the number and the text description associated with the sending entity; and a screen for simultaneously displaying the number and the text description associated with the sending entity as a title of the SMS message.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1~4 are diagrams illustrating a method of handling SMS message according to an embodiment of the present invention.

DETAILED DESCRIPTION

FIGS. 1~4 are diagrams illustrating a method of handling SMS message which can be sent to a receiving entity or from a sending entity. As used herein, the "receiving entity" and the "sending entity" may include transportable electronic devices such as mobile telephones, personal digital assistants, handheld, tablet, nettop, or laptop computers, or other devices with similar telecommunication capabilities. In other cases, the "receiving entity" and the "sending entity" may include non-transportable devices with similar telecommunications capabilities, such as desktop computers, set-top boxes, or network appliances. The "receiving entity" and the "sending entity" may also include any hardware or software component that can terminate a communication session for a user. As well-known to those skilled in the art, the term "entity" may also be referred to "mobile device", "mobile station", "MS", "user equipment", "UE", and the like.

Figure 1:
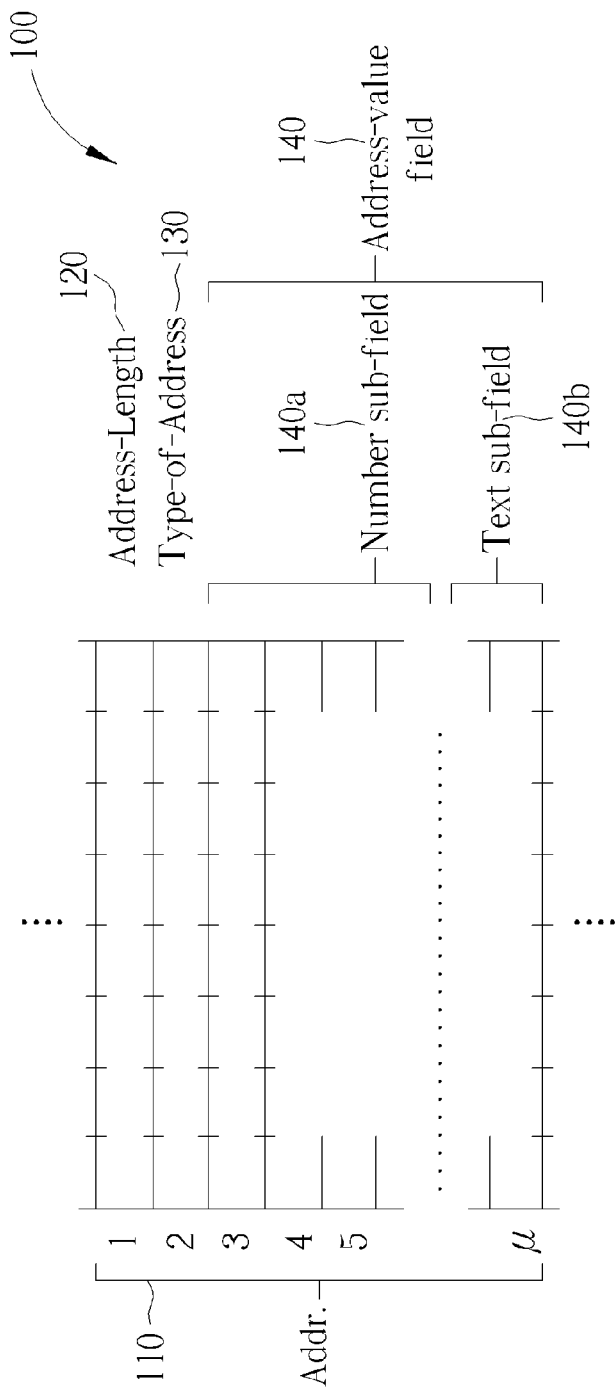

FIG. 1 is a diagram illustrating the structure of the TP-OA field 100 of an SMS message according to an embodiment of the present invention. The TP-OA field 100 includes an Address-Length field 120, a Type-of-Address field 130, and an Address-Value field 140. The Address-Value field 140 includes a number sub-field 140a and a text sub-field 140b.

Figure 2:
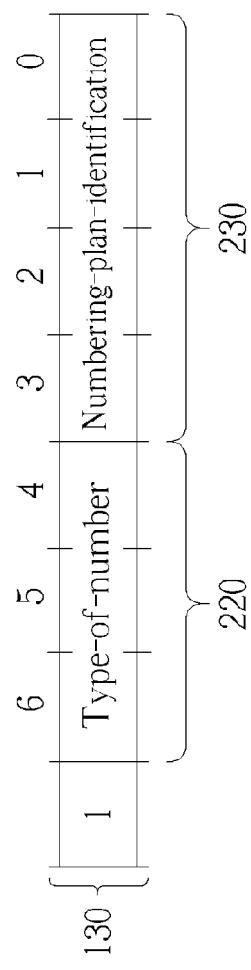

FIG. 2 is a diagram illustrating the format of the Type-of-Address field 130 within the TP-OA field 110 according to the present invention. The Type-of-Address field 130 includes a 3-bit Type-of-Number field 220 and a 4-bit Numbering-Plan-Identification field 230.

FIG. 3 is a diagram illustrating the possible binary values that could be placed in the Type-of-Number field 220 and their corresponding number types. FIG. 4 is a diagram illustrating the possible binary values that could be placed in the Numbering-Plan-Identification field 230 and their corresponding numbering plan identifiers. The embodiments illustrated in FIGS. 3 and 4 are based on the 3GPP technical specification TS 23.040.

The following table illustrates an encoding scheme of the Address-Value field 140 of the present invention. The present invention may adopt the "GSM 7-bit default alphabet table" defined in the 3GPP technical specification TS 23.038. With b1~b7 representing the 7 bits set to either 0 or 1, the GSM 7-bit default alphabet shown in the following table may accommodate 128 characters, such as capital/small Latin/Greek letters, punctuation marks, digital numbers, mathematical symbols and currency signs.

TABLE

| | | | | b7 | 0 | 0 | 1 | 1 | 0 | 0 | 1 | 1 |
|---|---|---|---|---|---|---|---|---|---|---|---|---|
| | | | | b6 | 0 | 1 | 0 | 1 | 0 | 1 | 0 | 1 |
| b4 | b3 | b2 | b1 | b5 | 0 | 1 | 2 | 3 | 4 | 5 | 6 | 7 |
| 0 | 0 | 0 | 0 | 0 | @ | Δ | SP | 0 | ¡ | P | ¿ | p |
| 0 | 0 | 0 | 1 | 1 | £ | _ | ! | 1 | A | Q | a | q |
| 0 | 0 | 1 | 0 | 2 | $ | Φ | " | 2 | B | R | b | r |
| 0 | 0 | 1 | 1 | 3 | ¥ | Γ | # | 3 | C | S | c | s |
| 0 | 1 | 0 | 0 | 4 | è | Λ | ¤ | 4 | D | T | d | t |
| 0 | 1 | 0 | 1 | 5 | é | Ω | % | 5 | E | U | e | u |
| 0 | 1 | 1 | 0 | 6 | ù | Π | & | 6 | F | V | f | v |
| 0 | 1 | 1 | 1 | 7 | ì | Ψ | ' | 7 | G | W | g | w |
| 1 | 0 | 0 | 0 | 8 | ò | Σ | ( | 8 | H | X | h | x |
| 1 | 0 | 0 | 1 | 9 | Ç | Θ | ) | 9 | I | Y | i | y |
| 1 | 0 | 1 | 0 | 10 | LF | Ξ | * | : | J | Z | j | z |
| 1 | 0 | 1 | 1 | 11 | Ø | 1) | + | ; | K | Ä | k | ä |
| 1 | 1 | 0 | 0 | 12 | ø | Æ | ' | < | L | Ö | l | ö |
| 1 | 1 | 0 | 1 | 13 | CR | æ | — | = | M | Ñ | m | ñ |
| 1 | 1 | 1 | 0 | 14 | Å | ß | . | > | N | Ü | n | ü |
| 1 | 1 | 1 | 1 | 15 | å | É | / | ? | O | § | o | à |

There are two types of SMS messages: mobile originated and application originated. A mobile originated SMS message is a message that was originally sourced from another mobile device or, more generally, from another mobile operator subscriber. An application originated SMS message is a message that was originally sourced from an entity in the network.

The source address from which the message originated is encoded in the number sub-field 140a and the text sub-field 140b of the present invention. For a mobile originated SMS message, the content of the number sub-field 140a represents a routable number which can be replied to, while the content of the text sub-field 140b may be the name of the sender of the mobile originated SMS message. For an application originated SMS message, the content of the number sub-field 140a represents a non-routable number which cannot be replied to, while the content of the text sub-field 140b may be the name of a subscribed service, an advertisement company or an on-line activity.

Throughout the description of the present invention, it should be understood that the term "source address" as used herein can refer to any identifier or other text associated with a sending entity and is not limited to routable or non-routable numbers.

As illustrated in FIGS. 3 and 4, the TP-OA field 110 may consist of a Type-of-Number setting of 101 and a Numbering-Plan-Identification setting of 0000. This allows a number and a string of text to be simultaneously shown as the title of an SMS message on the receiving entity. In an embodiment when transmitting a mobile originated SMS message from a first cell phone of a sender to a second cell phone of a receiver, the number of the first cell phone, according to the current subscriber identity module (SIM) card installed in the first cell phone, and the name of the sender may appear as the title of the SMS message shown on the second cell phone even if the number of the first cell phone is currently not included in the contact list stored in the second cell phone.

In an embodiment when transmitting an application originated SMS message from a network entity to a personal cell phone of a receiver, the number of the SMS gateway serving the network entity and a text description of the network entity may appear as the title of the SMS message shown on the personal cell phone. For example, the name of a television show may appear in the title of the SMS message if the show uses SMS voting and sends a "thank you for your vote" type of message. As another example, the name of a subscribed service, such as a service that sends texts with sports results, may appear in the title of the SMS message.

A generic description of the operation of a sending entity for performing the method of the present invention is described as follows: (1) provide a sender number associated with the sending entity; (2) provide a sender description using characters which are accommodated in the GSM 7-bit default alphabet shown in the table listed above; (3) encode an SMS message by inserting the sender number in the number sub-field of the Address-Value field in the TP-OA field and by inserting the sender description in the text sub-field of the Address-Value field in the TP-OA field according to the GSM 7-bit default alphabet table; (4) perform any other existing functions, and then send the SMS message to the receiving entity.

A generic description of the operation of a receiving entity for performing the method of the present invention is described as follows: (1) determine the chosen encoding scheme of SMS messages (2) decode the number sub-field of the Address-Value field in the TP-OA field for acquiring the sender number; (3) decode the text sub-field of the Address-Value field in the TP-OA field for acquiring the sender description; (4) display the sender number and the sender description as the title of the SMS message on a screen.

For correct interpretation of SMS messages after transmission, the receiving entity must be compatible to the encoding scheme of SMS messages. Since the present invention adopts the current default encoding scheme according to the GSM 7-bit default alphabet, there is no need for further enhancements or upgrades of the receiving entity.

In 3GPP/GSM/UMTS/LTE networks, the encoding of the TP-OA field has no effect on its delivery. This is because the routing and transferring of SMS messages is performed based on the destination address in the TP-Destination Address (TP-DA) field. In addition, the SMS message is wrapped in other protocols, such as non access stratum (NAS) signaling or mobile application part (MAP) signaling, in order to transport the message across the different parts of the different networks from the sending entity to the receiving entity. Therefore, the present method of encoding the TP-OA field has no effect on the transfer of the SMS message, since the source address of the transport protocol is independent of the source address of the SMS message in the TP-OA field.

Figure 5:
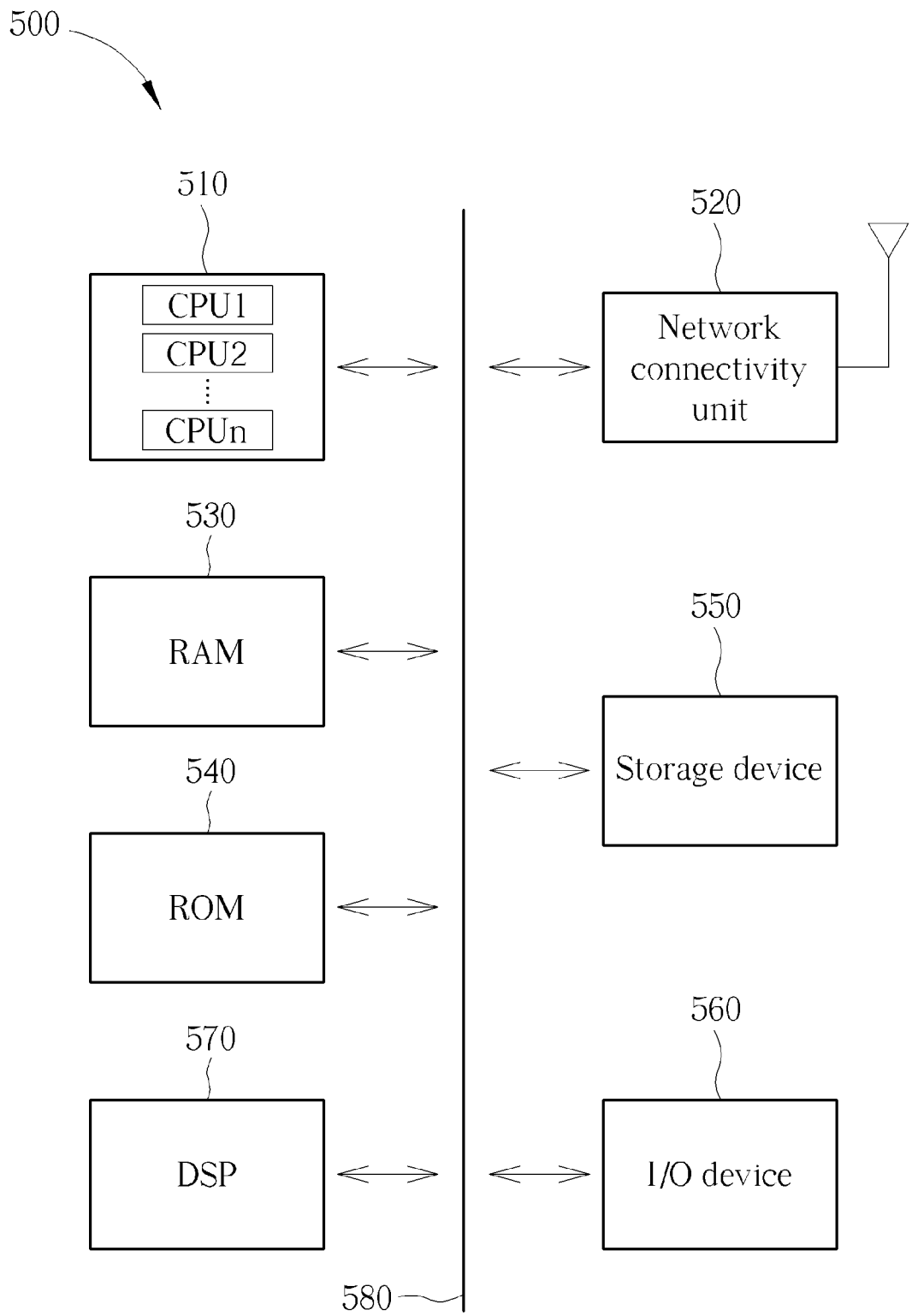
FIG. 5 is a functional diagram illustrating a system which may be used for carrying out the present method depicted in FIGS. 1~4.

The sending entity and the receiving entity described above may include a processing component capable of executing instructions related to the actions described above. FIG. 5 is a functional diagram illustrating a system 500 which may be used in the sending entity and the receiving entity for carrying out the present method. The system 500 includes a processing component 510, a network connectivity unit 520, random access memory (RAM) 530, read only memory (ROM) 540, a storage device 550, an input/output (I/O) device 560, and a digital signal processor (DSP) 570. These components might communicate with one another via a bus 580. In some cases, some of these components may not be present or may be combined in various combinations with one another or with other components not shown. These components might be located in a single physical entity or in more than one physical entity. Any actions described herein as being taken by the processing component 510 may be taken by the processing component 510 alone or by the processing component 510 in conjunction with one or more components shown or not shown in the drawing, such as with the DSP 570. Although the DSP 570 is shown as a separate component, the DSP 570 might be incorporated into the processing component 510.

The processing component 510 is configured to execute instructions, codes, computer programs, or scripts which may be accessed from the network connectivity units 520, RAM 530, ROM 540, or the storage device 550. The processing component 510 may include one or multiple processors CPU1~CPUn for executing the present method simultaneously, serially, or otherwise by one processor.

The network connectivity unit 520 may include one or multiple modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, GSM/UMTS/LTE radio transceiver devices, worldwide interoperability for microwave access (WiMAX) devices, and/or other well-known devices for connecting to networks. The network connectivity unit 520 allows the processing component 510 to communicate with the Internet or one or more telecommunications networks.

The RAM 530 may be used to store volatile data and instructions that are executed by the processing component 510. The ROM 540 may be used to store instructions and data that are read during execution of the instructions. The storage device 550 may include various disk-based systems such as hard disk, floppy disk, or optical disk and may be used to store programs that are loaded into the RAM 530 when such programs are selected for execution. Access to both the RAM 530 and the ROM 540 is typically faster than access to the storage device 550, but the storage device 550 can provide larger memory capacity The I/O devices 560 may include one or more of liquid crystal display (LCD) screens, touch screen displays, keyboards, keypads, switches, dials, mice, track balls, voice recognizers, card readers, paper tape readers, printers, video monitors, or other well-known input/output devices.

In the present invention, a sending entity is configured to encode an SMS message by inserting both the sender number and the sender description of the sending entity in the TP-OA field according to the GSM 7-bit default alphabet table. After transmission, a receiving entity is configured decode the TP-OA field and simultaneously display the sender number and the sender description as the title of the SMS message on a screen. Therefore, the present invention can provide efficient recognition of the sending entity in SMS applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a short message service (SMS) message which is sent from a sending entity to a receiving entity, the method comprising:
providing a number and a text description associated with the sending entity;
the sending entity encoding the SMS message by inserting the number associated with the sending entity in a number sub-field of an Address-Value field in a Transfer-Protocol-Originating-Address (TP-OA) field of the SMS message and by inserting the text description associated with the sending entity in a text sub-field of the Address-Value field in the TP-OA field of the SMS message;
the sending entity transmitting the encoded SMS message to the receiving entity;
the receiving entity decoding the number sub-field of the Address-Value field in the TP-OA field of the received encoded SMS message for acquiring the number associated with the sending entity;
the receiving entity decoding the text sub-field of the Address-Value field in the TP-OA field of the received encoded SMS message for acquiring the text description associated with the sending entity; and
the receiving entity simultaneously displaying the number and the text description as a title of the SMS message on a screen.

2. The method of claim 1, wherein the text description associated with the sending entity is provided using characters which are accommodated in a Global System for Mobile Communications (GSM) 7-bit default alphabet table defined in a 3rd Generation Partnership Project (3GPP) technical specification TS 23.038.

3. The method of claim 1, wherein the number associated with the sending entity is provided using digital numbers which are accommodated in a GSM 7-bit default alphabet table defined in a 3GPP technical specification TS 23.038.

4. The method of claim 1, wherein the number associated with the sending entity is determined by a subscriber identity module (SIM) card installed in the sending entity.

5. The method of claim 1, wherein the number associated with the sending entity is determined by an SMS gateway serving the sending entity.

6. A communication system for performing SMS operations comprising:
a sending entity including:
a processing component configured to encode an SMS message by inserting a number associated with the sending entity in a number sub-field of an Address-Value field in a TP-OA field of the SMS message and by inserting a text description associated with the sending entity in a text sub-field of the Address-Value field in the TP-OA field of the SMS message; and
a network connectivity unit configured to transmit the encoded SMS message; and
a receiving entity including:
a network connectivity unit configured to receive the encoded SMS message sent from the sending entity;
a processing component configured to decode the number sub-field of the Address-Value field in the TP-OA field of the received encoded SMS message for acquiring the number associated with the sending entity and decode the text sub-field of the Address-Value field in the TP-OA field of the received encoded SMS message for acquiring the text description associated with the sending entity; and
a screen for simultaneously displaying the number and the text description associated with the sending entity as a title of the SMS message.

* * * * *